(12) United States Patent
Solass et al.

(10) Patent No.: US 12,545,377 B2
(45) Date of Patent: Feb. 10, 2026

(54) SYSTEM AND METHOD FOR DETERMINING THE MASS OF A SHIP MOVING IN WATER

(71) Applicant: Fraunhofer-Gesellschaft zur Förderung der angewandten Forschung e.V., Munich (DE)

(72) Inventors: Johannes Solass, Freiburg (DE); Corinna Köpke, Freiburg (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 404 days.

(21) Appl. No.: 18/032,943

(22) PCT Filed: Oct. 26, 2021

(86) PCT No.: PCT/EP2021/079665
§ 371 (c)(1),
(2) Date: Apr. 20, 2023

(87) PCT Pub. No.: WO2022/090217
PCT Pub. Date: May 5, 2022

(65) Prior Publication Data
US 2023/0399083 A1    Dec. 14, 2023

(30) Foreign Application Priority Data
Oct. 26, 2020 (EP) .................................. 20203863

(51) Int. Cl.
*B63B 79/10* (2020.01)
*G01G 19/08* (2006.01)
(Continued)

(52) U.S. Cl.
CPC .......... *B63B 79/10* (2020.01); *G01G 19/086* (2013.01); *G01V 7/06* (2013.01); *G01V 7/16* (2013.01); *G01G 19/00* (2013.01)

(58) Field of Classification Search
USPC ........................................................ 702/175
See application file for complete search history.

(56) References Cited

U.S. PATENT DOCUMENTS 6,836,746 B2    12/2004  Coder et al.
11,001,392 B1 *  5/2021  Kern .................... G01G 23/002
(Continued)

FOREIGN PATENT DOCUMENTS

CN        106052694 B      3/2017

OTHER PUBLICATIONS

Lin Wu et al: "Automated gravity gradient tensor inversion for underwater object detection", Journal of Geophysics and Engineering, Institute of Physics Publishing, Bristol, GB, Bd. 7, Nr. 4, Oct. 26, 2010 (Oct. 26, 2010), Seiten 410-416, XP020202021, ISSN: 1742-2140, DOI: 10.1088/1742-2132/7/4/008, 7 pages.

(Continued)

*Primary Examiner* — Paul D Lee
(74) *Attorney, Agent, or Firm* — Fitch, Even, Tabin & Flannery LLP (57) ABSTRACT

A system and a method which determines the mass of a ship moving in water, comprising at least two gravitational field strength sensor units that are stationary relative to the ship at a known distance from each other, and an analytical unit which determines the mass of the ship based of measurement signals acquired by the at least two GFS sensor units.

20 Claims, 5 Drawing Sheets

(51) Int. Cl.
  *G01V 7/06* (2006.01)
  *G01V 7/16* (2006.01)
  *G01G 19/00* (2006.01)

(56) References Cited

U.S. PATENT DOCUMENTS

| | | | | |
|---|---|---|---|---|
| 2006/0117848 A1* | 6/2006 | Raffalt | ................ | G01F 23/0038 |
| | | | | 73/313 |
| 2010/0153050 A1* | 6/2010 | Zumberge | ................ | G01V 7/16 |
| | | | | 702/92 |
| 2017/0369127 A1* | 12/2017 | Cusano | ................ | G01S 13/956 |

OTHER PUBLICATIONS

Lin Wu et al: "Underwater Object Detection Based on Gravity Gradient", IEEE Geoscience and Remote Sensing Letters, IEEE Service Center, New York, NY, US, Bd. 7, Nr. 2, Apr. 1, 2010 (Apr. 1, 2010), Seiten 362-365, XP011332644, ISSN: 1545-598X, DOI: 10.1109/LGRS.2009.2035455, 4 pages.
International Search Report and Written Opinion for PCT/EP2021/079665, dated Feb. 1, 2022, 14 pages.

\* cited by examiner

SYSTEM AND METHOD FOR DETERMINING THE MASS OF A SHIP MOVING IN WATER

CROSS REFERENCE TO RELATED APPLICATIONS

Reference is made to PCT/EP2021/079665 filed Oct. 26, 2021, designating the United States, and European Application No. 20 203 863.4 filed Oct. 26, 2020, which are incorporated herein by reference in their entirety.

BACKGROUND OF THE INVENTION

Field of the Invention

The invention relates to a system and a method for determining the mass of a ship moving in water.

Description of the Prior Art

Knowledge of the actual mass of a ship in general and of a modern freighter and container-ship in particular is useful primarily in the interest of safety and for avoiding dangerous incidents up to and including shipwrecks, the causes of which are most often attributable to overloading or improper loading, and unfavourable mass distribution of the ship associated therewith. Incorrectly declared goods or contraband that is carried in addition to the declared goods may also be discovered more easily by customs authorities with a determination of the actual weight of the ship. If a reliable, that is to say independently calculable indication of the actual weight of the ship were available to customs and other agencies, such as insurance companies, shipping companies, and even marine offices, a comparison with the declared nominal weight could reveal discrepancies and thus justify taking further steps, for example in the form of at least one of physical checks and visual inspection of the ship's cargo.

Since ships are generally too large to allow weighing them directly so that a ship's mass is usually determined using approximation methods, which are based on establishing the volume of displaced water on the basis of the ship's draught. There are ship-specific, hydrostatic charts in which the volume displaced by a ship is tabulated as a function of its draught. By multiplying the volume of displaced water by the density of the water, a conclusion can be drawn about the weight of the ship.

U.S. Pat. No. 6,836,746 discloses a sensor system that determines the additional load of a ship due to a change in position of multiple sensors mounted above the waterline by establishing a difference in their sensor signals compared with the empty state of the ship. However, the weight of the ship determined in this way is only available to the ship's crew and for the most part is unknown to inspection authorities. Only the draught of a ship is usable as the sole indicator for making an independent determination of the mass of the ship concerned, with the aid of the automatic identification system, abbreviated to AIS. However, since these indicators are highly likely to contain inaccuracies, the conclusions regarding the actual weight of the ship are also prone to errors.

The documents Lin Wu et al., "Automated Gravity Gradient Tensor Inversion for Underwater Object Detection", Journal of Geophysics and Engineering Institute of Physics Publishing, Bristol, GB, Vol. 7, No. 4, 26 Oct. 2010 (2010 Oct. 26), pages 410-416, and Lin Wu et al., "Underwater Object Detection Based on Gravity Gradient", IEEE Geoscience and Remote Sensing Letter, Vol. 7, No. 2, April, 2010, each disclose a system for determining the mass and shape of an underwater object with the aid of a gradiometer, which is capable of acquiring a gravity gradient. In order to be able to capture an underwater object with an adequate degree of accuracy in this way, a sufficient density difference must exist. The underwater object must be at rest for the duration of the gradiometer measurements, and the mass of this specific object can only be determined when its geometry and corresponding density distribution are known exactly enough.

SUMMARY OF THE INVENTION

The problem addressed by the invention is that of describing a system and a method for determining the mass of a ship moving in water with a degree of accuracy high enough to enable authorities to carry out weight checks of ships moving through the water, so that they are in a position to implement further steps on the basis of the weight of the ships determined thereby. The measures required for this should not restrict the movement of ships in any way and it should be possible to carry out the measures independently of the ships' own control and measurement systems.

The system according to the invention for determining the mass of a ship moving in water uses the immanent influence of the ship's mass on the Earth's gravitational field, which is captured quantitatively by sensors. For this purpose, the system provides at least two gravitational field strength sensor units, abbreviated to GFS sensor units, which are mounted stationarily relative to the moving ship at a known distance from each other. The system further comprises an analytical unit, which carries out the determination of the ship's mass on the basis of measurement signals acquired with the aid of the at least two GFS sensor units.

A gravimeter, an acceleration sensor or accelerometer, or at least two time-synchronized atomic clocks are each preferably suited for use as the GFS sensor units.

Of the GFS sensor units identified above, a relative gravimeter is preferably suitable for the sensory acquisition of the change in local gravitational field strength over time, which in the preceding use case is caused by the presence of a ship's mass. Since the largest container ships currently in existence have a maximum mass of up to 200,000 tonnes, a gravimeter of the greatest possible accuracy and the greatest possible resolution is needed to be able to determine the mass with an accuracy of 100 tonnes, preferably of 10 tonnes and less. The gravimeters with the highest resolution currently available are superconducting gravimeters, which are able to acquire the gravitational field strength at the gravimeter's location with a measurement trigger of 0.1 $nm/s^2$ by capacitive measurement of the floating height of a niobium sphere above a superconducting ring, in which an electrical current flows without resistance.

In order to obtain an influence of the mass of a ship on the gravitational field at the location of the at least two GFS sensor units that can be detected with measuring instrumentation, the GFS sensor units must be arranged stationarily in the range of a trajectory of movement of a ship that is to be measured in such manner that the ship passes as closely as possible to the at least two GFS sensor units, preferably the GFS sensor units between both GFS sensor units, or particularly preferably passes vertically above one of the two GFS sensor units. The GFS sensor units are particularly ideally mounted in the area of a navigation channel or shipping route, preferably on or in the bed of the navigation channel or route, so that ships pass as closely as possible to, and preferably vertically over the GFS sensor units as they travel through the channel.

In a preferred embodiment, the at least two GFS sensor units, preferably installed on the bed of a navigation channel, are connected via a cable to a separately arranged electrical energy supply unit and the analytical unit, in which the measurement signals acquired with the aid of the GFS sensor units are used as the basis for determining the ship's mass. Apart from the measurement signals acquired with the aid of the GFS sensor units, knowledge of the spatial position of the vessel relative to the GFS sensor units during the passage of the ship is also helpful for determining the ship's mass, in order to achieve a desirable accuracy with regard to determining the ship's mass. Accordingly, not only the spatial distance between ship and the GFS sensor units but also the lateral offset relative to the gravitation vector between the ship and the GFS sensor units are significant. The exact data on the ship's position is available from the automatic identification system (AIS) or the universal automatic identification system (UAIS), or from the "Long-Range Identification and Tracking (LRIT) system, and is freely accessible for retrieval.

The accuracy with which the ship's mass can be determined on the basis of the change in gravitational field strength and the spatial relative position between the ship that is to be measured and the at least two GFS sensor units by detected by sensors depends on both the quality of the selected mathematically arithmetical calculation model within the analytical unit and the resolution capability of the GFS sensor units, above all on the measurement constellation, that is the spatial distance and position of the ship to be measured and the GFS sensor units. According to a rough estimate, a ship's mass of just 10 tonnes at a distance of 100 meters is able to cause a change in gravitational field strength of 0.0667 nm/s$^2$. Through the use of superconducting gravimeters, which have a measurement sensitivity of 0.1 nm/s$^2$, it would be entirely possible to detect a ship with a ship's mass of 10 tonnes at a distance of about 50 meters. The GFS sensor units are preferably operated with a measurement frequency typically of at least 1 Hz, so that the influence of the ship's mass can be acquired during the ship's approach, its direct passage, and also as the ship moves away from the GFS sensor units.

The GFS sensor units are ideally installed directly in the bed of the navigation channel, so that an ideal passage of the ships vertically over at least of the two GFS sensor units may be guaranteed. The measurement accuracy may be further improved as the distance between ship and the GFS sensor units is reduced. For example, the depth of water, corresponding to the distance between the navigation channel base or navigation channel bed and the water surface, is equal on average to 16 meters for the Elbe between Hamburg and Cuxhaven, and for the neighbouring region of the North Sea it increases to as much as 70 meters. Given water depths of this order and the associated, relatively small distances between ship and the GFS sensor units, it should be possible to acquire ships' masses with a resolution of less than 10 tonnes, down to values of 1 tonne, exactly with the measurement instrumentation.

In a further preferred embodiment, the GFS sensor units are designed as autonomous structural units, functioning together with an electrical energy supply unit, preferably in the form of a battery or rechargeable battery, in which a wireless communication unit is also integrated for transmitting the measurement signals to a separately arranged analytical unit.

An obvious development is to arrange a multiplicity of individual GFS sensor units preferably along the course of a navigation channel or shipping route at a specified distance from each other, and a ship's mass should be determined on the basis of all the measurement signals therefrom. The system of the multiplicity of GFS sensor units may be chosen in a linear pattern or a grid-like array arrangement on the bed of a navigation channel depending on the size of the ships to be measured.

The GFS sensor units are preferably operated at least immediately before, during and after the passage of a ship in a measuring mode in which the GFS sensor units return measurement values at a measuring frequency of at least 1 Hz.

The time-discrete capture of measurement values with a scanning frequency of at least 1 Hz as explained above also makes possible using the measurement values obtained during the ship's passage as the basis for a determination of the ship's mass distribution. Since the geometric data of the respective ship, that is length and beam, are known, obtainable from the AIS information, for example, the signal amplitude variations that occur in the measurement signals as the ship is passing may be evaluated and analysed for various mass distributions within the ship.

When the at least two GFS sensor units are installed along a shipping route or navigation channel, it is advantageous to select the distance between them to be less than the lengths of the ships that typically travel on that route and are to be measured. In this way, locally resolved ships' mass distribution within the ship may be determined with the aid of the at least two separate GFS sensor units that are passed by a ship at the same time. It is also possible to improve the measurement accuracy for determining mass through measurement redundancies by using multiple GFS sensor units.

The system and method according to the invention may be used to establish a measurement arrangement with which it is possible to determine a ship's mass independently, that is entirely autonomously. Consequently, the mass of a ship may be measured upon its arrival in port and when it leaves, and compared with the information supplied by the ship owner. In combination with the loading and unloading data at the disposal of the port authority, this enables the movement of merchandise and goods to be monitored efficiently, and any anomalies can be reported to the customs and port authorities. If significant, unexplained deviations are observed, this may be assessed as an indication of goods that have not been declared in good order, or contraband. If the system is implemented as suggested in all larger ports, for example European ports, it will be possible in this way to efficiently monitor the movement of merchandise within Europe.

Shipping lanes in the North Sea are extremely busy, and they also represent a difficult region for ships' crews, as sandbanks and navigation channels can shift. One of the factors affecting the maneuverability of ships is their overall mass, which is critically important particularly for avoidance manoeuvres. For this reason, a more accurate determination and knowledge of the total mass of a ship would be helpful to ships' pilots, for example, when navigating ships safely through uncertain waters.

BRIEF DESCRIPTION OF THE DRAWINGS

In the following text, the invention will be described for exemplary purposes without limitation of the general inventive thought using embodiments thereof and with reference to the drawing. In the drawing.

DETAILED DESCRIPTION OF THE DRAWINGS

Figure 1:
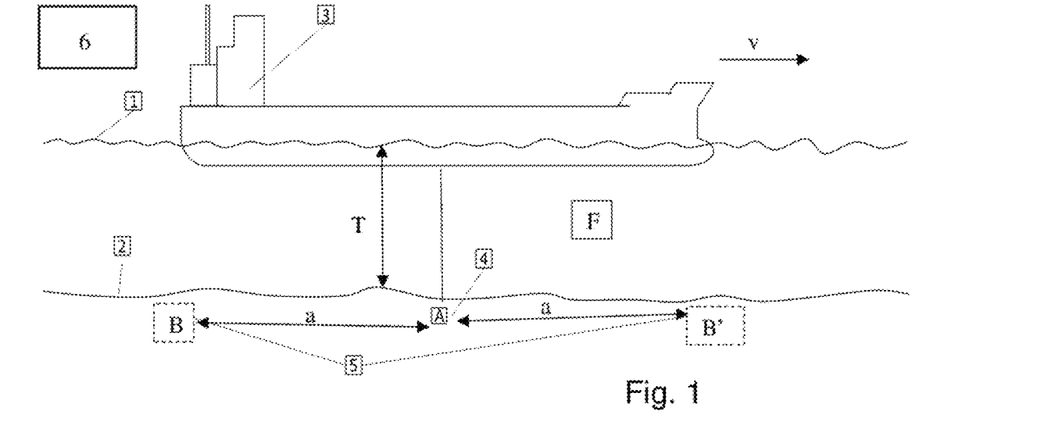
FIG. 1 represents the measurement system on the bed of a navigation channel.

FIG. 1 illustrates a side view of a navigation channel F along which a ship 3 moves on the surface of the water 1 at a preferably constant true speed v. The navigation channel F has a depth of water T, which corresponds to the distance between the water surface and the navigation channel bed 2. At least two, preferably three or more gravitational field strength (GFS) sensor units 4 are installed at locations A, B, B' on or in the navigation channel bed 2, and in the state shown according to FIG. 1, the ship 3 travels vertically over them. For this purpose, the distances a between the GFS sensor units 4, 5 are chosen smaller than the ship's length.

The GFS sensor unit 4 is preferably embodied as a superconducting gravimeter which measures the locally prevailing gravitational field strength g with a measuring frequency of at least 1 Hz.

Figure 2:
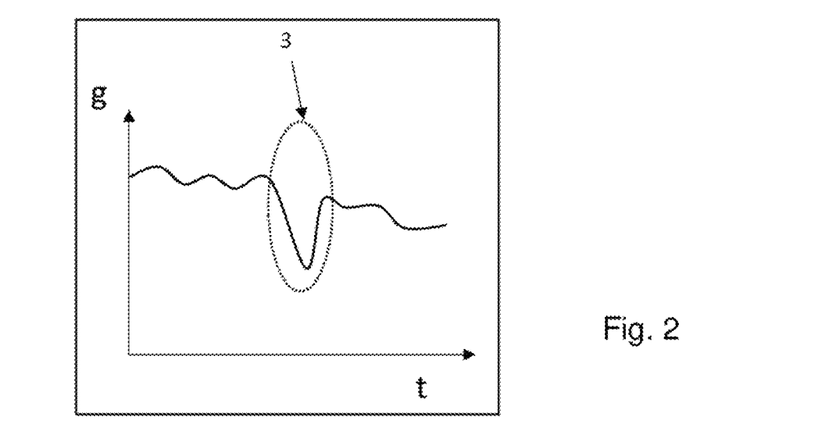
FIG. 2 is a measurement diagram for acquisition of the change in gravitational field strength.

FIG. 2 is a measurement diagram with an x-axis as time axis t and a y-axis on which the measurement signals collected by the GFS sensor unit are plotted, each representing the temporally resolved gravitational field strength g. The local minimum represented in the measurement curve originates from the passage of the ship 3 over the GFS sensor unit, that is at the time of closest proximity between the center of mass of the ship 3 and the GFS sensor unit installed on the bed of the navigation channel 2, the gravitational field strength g decreases locally due to the ship's own gravity. The quantitative decrease of the gravitational field strength prevailing locally at the site of the GFS sensor unit is substantially proportional to the mass of the ship. Thus, a conclusion about the overall mass of the ship may be drawn on the basis of this change in measured value. The ship's mass is calculated in an analytical unit 6, to which the measurement signals of the GFS sensor unit 4 are transmitted via cable or wirelessly for analysis and determination of the ship's mass. Besides the measurement signals, the analytical unit 6 also receives, via AIS for example, the exact position data for the ship, to enable it to capture the relative position between the GFS sensor unit and the ship. The analytical unit is preferably supported from ashore and is arranged to be accessible by an oversight authority.

Figure 3A:
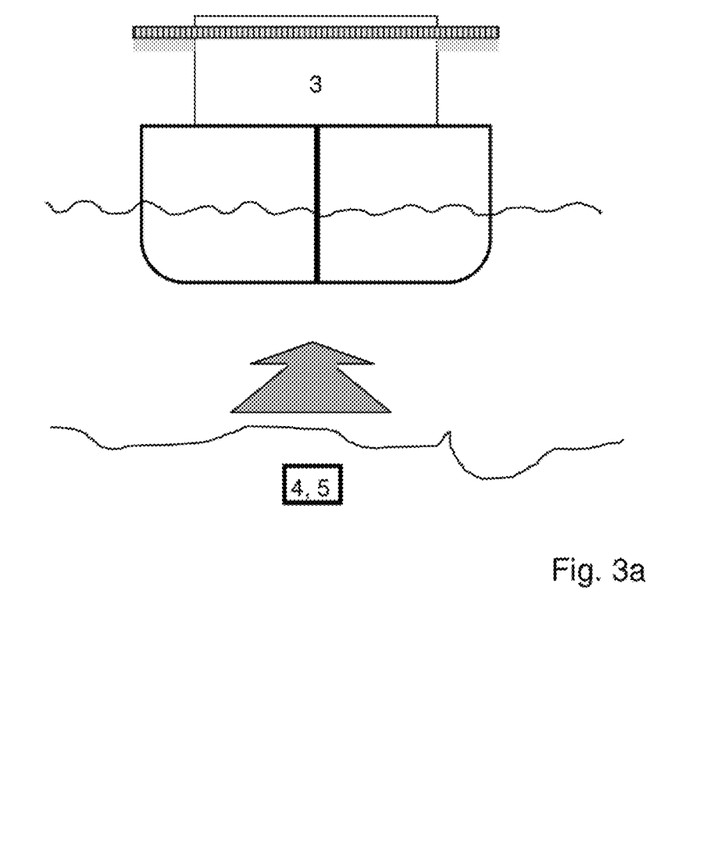
FIG. 3*a, b* shows an alternative system variant for installing the GFS sensor units.

Ship 3 ideally moves over the GFS sensor unit 4, 5 vertically above the locations of the GFS sensor units 4, 5, which are arranged one behind the other in FIG. 3*a*. In this case, the mass of the ship 3 is able to counteract the Earth's gravitational force at the locations of the GFS sensor units 4, 5, so that in this case a maximum influence of the ship's mass can be measured at the locations of the GFS sensor units 4 in each case.

This constellation can be achieved if the GFS sensor units 4, 5 are arranged along a navigation channel which is sufficiently narrow, preferably less than 300 meters. Apart from the determination of the ship's mass, in this case the GFS sensor units 4, 5 also function as position detectors, so that the position of the passing ship can be detected with a sufficient degree of accuracy.

Figure 3B:
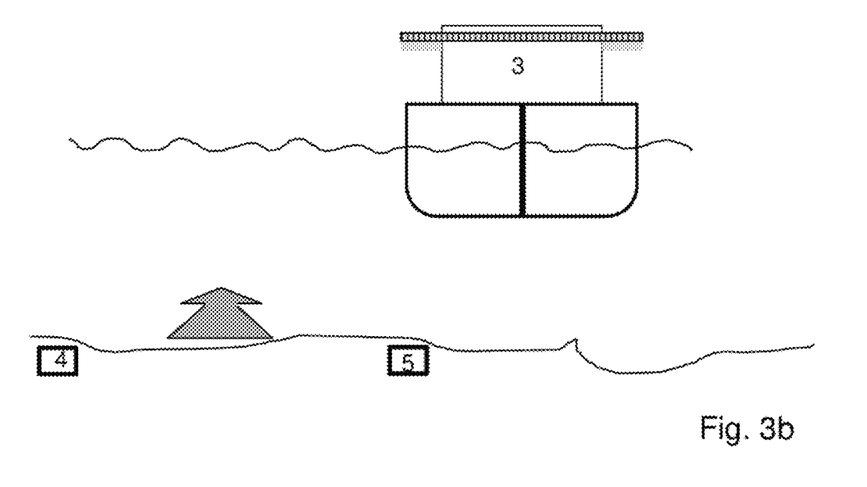

FIG. 3*b* illustrates the case in which the GFS sensor units 4, 5 are arranged on the bottom of a navigation channel or shipping route in such manner that the ship 3 does not pass vertically over the GFS sensor units 4, 5, but rather with a lateral offset. The weight of the ship as well as the ship's position can be determined accurately enough on the basis of the at least two GFS sensor units 4 and the measurement signals that can be calculated therewith. Additionally, information about the mass or weight distribution within the ship can be obtained by combining the two GFS sensor units 4, 5, each being operated with a measuring frequency of at least 1 Hz.

Figure 4:
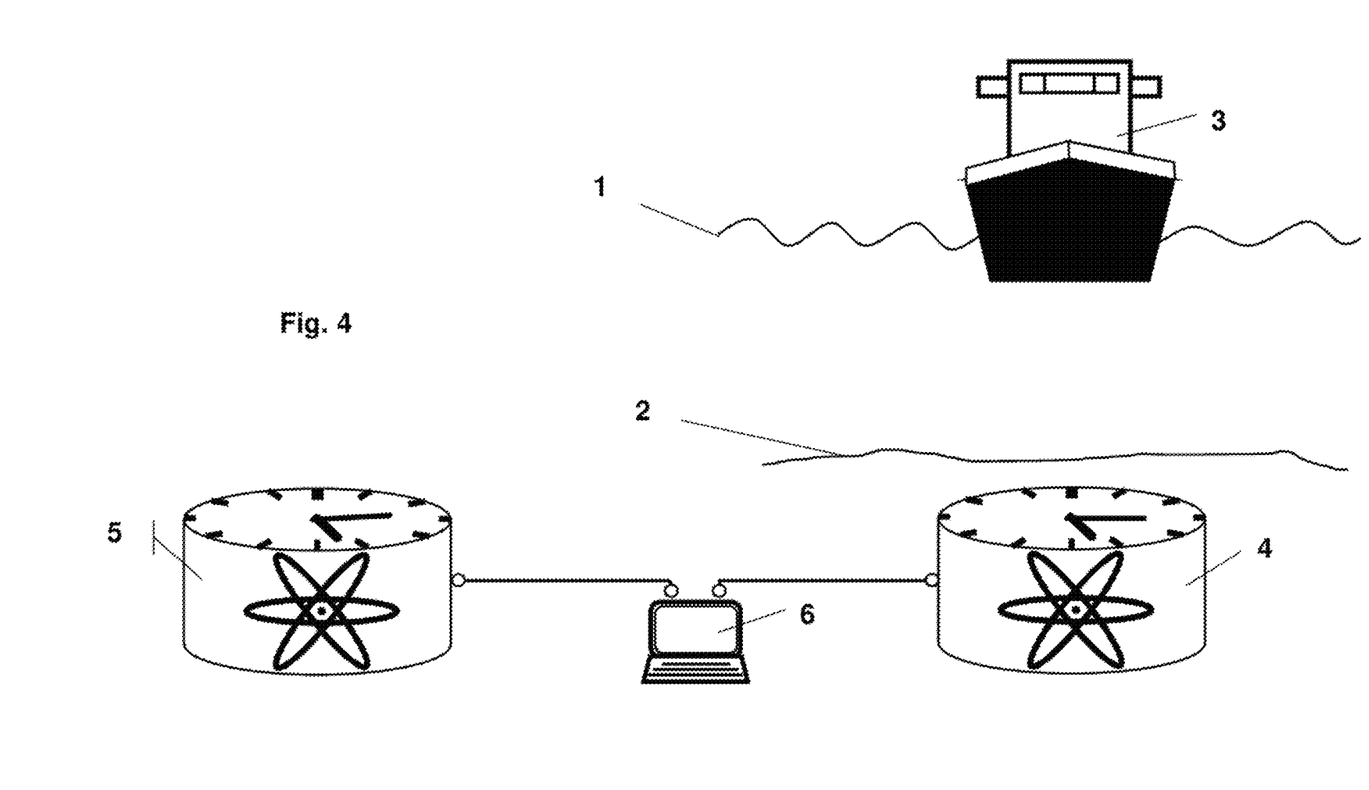
FIG. 4 shows a measurement system with two atomic clocks.

FIG. 4 illustrates a measurement system using two time-synchronized atomic clocks as GFS sensor units, of which a first atomic clock 4 is arranged on the seafloor 2, and a second atomic clock 5 is located in another position where the presence of the ship's mass does not have a measurable effect on the local gravitation field. The spatial proximity of the ship's mass of a ship 3 passing preferably vertically over the atomic clock 4 arranged on the seafloor 2 causes the gravitational field strength prevailing locally at the site of the atomic clock 4 to change due to the gravitational effect of the ship 3, which in turn causes the system time of the atomic clock 4 to run more slowly, in accordance with Einstein's principle of gravitational space-time curvature, than at the location of the second atomic clock 5, which is provided for example at the site of the analytical unit 6, at a distance of some kilometres, on land. The time lag is proportional to the change in the gravitational field, and thus also proportional to the ship's mass that causes it. This may be calculated with the aid of the analytical unit 6.

With the aid of the system according to the invention, it is possible to significantly improve safety for port operators and to enhance monitoring capabilities for customs and harbor police. An analytical method for improved tracking of the movement of goods within a harbor or in the marine region close to the harbor or coast may be established on the basis of the system according to the invention.

The measurement signals obtained with the measuring systems described in the preceding text are used for determining the mass of a ship, the ship's mass of which generally corresponds to the mass of water displaced by the ship. However, the center of mass of the ship and the center of gravity of the displaced water mass are not locationally identical. Consequently, although the gravitational effect of the ship's mass and that of the displaced water mass are identical, the locations from which these gravitational effects emanate are not the same. This locational difference forms the basis of measurement therefor for the purpose of measuring changes in local gravitational fields caused by a moving ship using gravimeters or accelerometer, and drawing conclusions about the mass of a passing ship from the measurement data obtained in this way.

Figure 5:
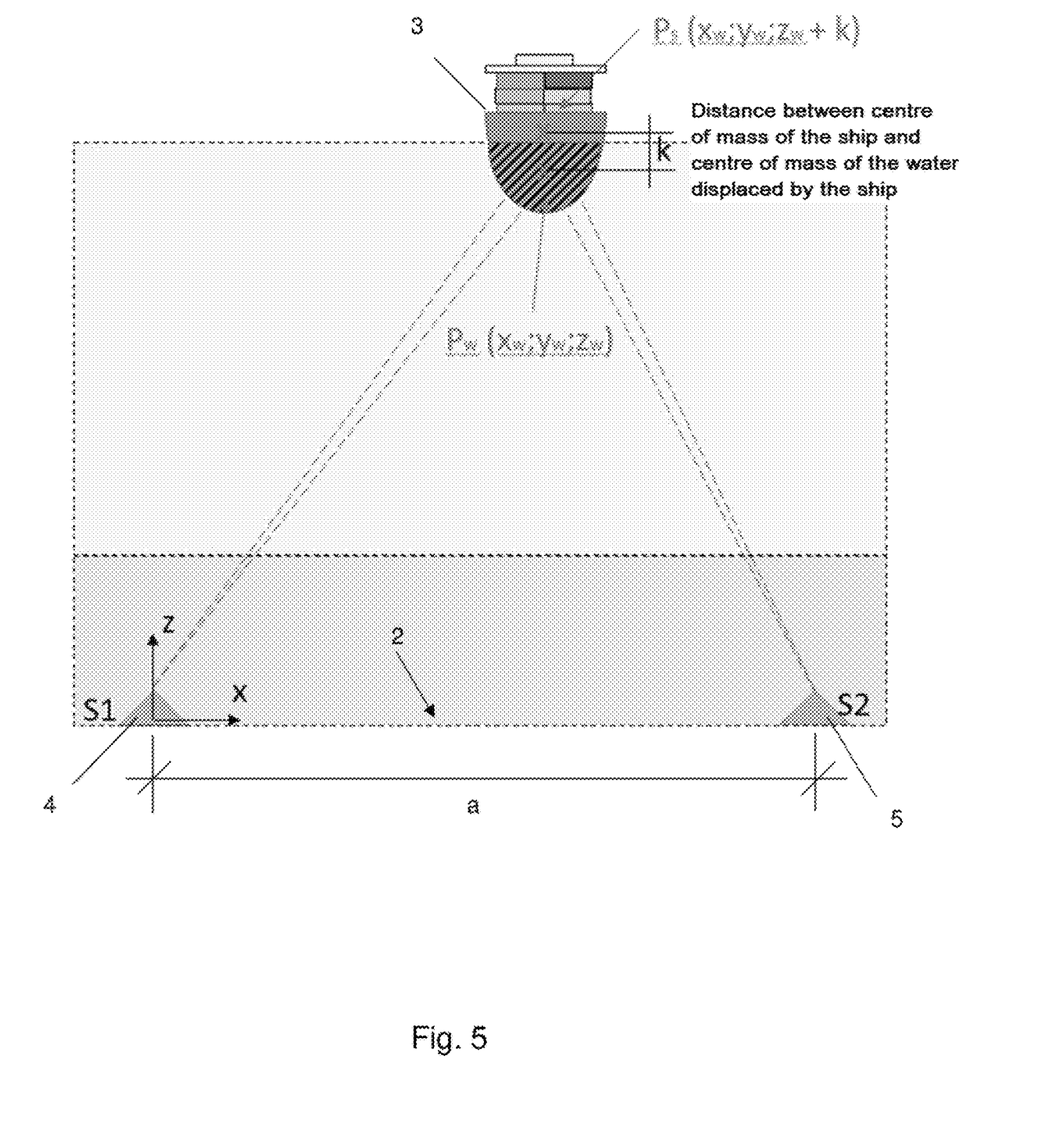
FIG. 5 is representation of the underlying measurement principle, based on the difference in the positions of the centres of mass between the ship's mass and the displaced water mass.

In this regard, FIG. 5 shows a schematic cross-sectional representation through a shipping lane or channel, along which a ship is moving at constant speed v. It may be assumed that the ship 3 is following a travel direction orthogonal to the plane of the drawing, corresponding to the y-axis of a Cartesian coordinate system, whose x- and z-axes may are discernible in FIG. 5. Two gravitational field strength sensor units 4, 5 are installed on the seabed or the bottom of navigation channel 2 at a distance a from each other along the x-axis. The ship 3 has a center of mass Ps, the spatial position of which is at a distance k vertically above the center of mass Pw of the water displaced by the ship 3, that is it is assumed that the center of mass Pw of the water displaced is expressed in the Cartesian coordinate system used by the coordinates (xw, yw, zw), whereas the center of mass Ps of the ship is expressed by the coordinates (xw, yw, zw+k).

In principle, the following relationships apply:

The gravitational acceleration exerted by a body having mass m at a distance r can be described with the following equation:

$$g = \frac{mG}{r^2}$$

where: g=Gravitational acceleration
m=Mass of the body exerting the gravitational acceleration
G=Gravitational constant
r=Spatial distance Accordingly, the following apply for the gravitational effects gw of the mass of water displaced by the ship and gS of the ship's mass at the location of the gravitational field strength sensor unit 4:

$$g_W = \frac{m \cdot G}{x_w^2 + y_{w,i}^2 + z_w^2} \text{ and } g_S = \frac{m \cdot G}{x_w^2 + y_{w,i}^2 + (z_w + k)^2}$$

Accordingly, the gravitational influence of a passing ship may be formulated in simplified terms as the difference between the gravitational effect of the displaced water and that of the ship:

$$\Delta g_i = \frac{m \cdot G}{x_w^2 + y_{w,i}^2 + z_w^2} - \frac{m \cdot G}{x_w^2 + y_{w,i}^2 + (z_w + k)^2}$$

where: $y_{w,i} = i \cdot \Delta t \cdot v$
i={0, 1, 2, 3, . . . } number of a measurement while a ship is passing
v=Speed of the ship
$\Delta t$=Measurement interval of the sensor unit For the purposes of the above, it was assumed that the ship only moves in the y direction when passing and the ship's speed is constant.

Figure 6:
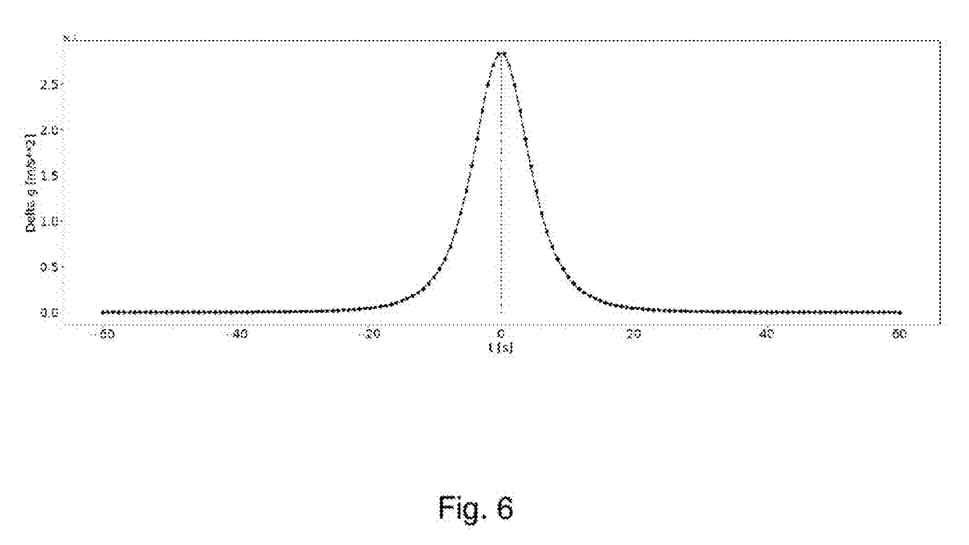
FIG. 6 is a diagram with synthetically generated measurement values for $\Delta g_i$ in [m/s$^2$].

If the change over time of the gravitational field strength is measured preferably quasi-continuously, that is, with a scanning rate of one measurement per second while a ship is passing over, a measurement plot similar to the diagram representation of FIG. 6 is obtained for each of the gravitational field strength sensor units 4, 5. In the diagram illustrated, the values for $\Delta g_i$ in [m/s$^2$] m are plotted on the y-axis, while the x-axis shows the timescale in seconds, with a ship's approach in the temporal range from −60 sec to <0 sec and a ship's departure in the in the temporal range from more than 0 sec to 60 sec. The ship passes over the gravitational field strength sensor units 4, 5 at time point 0 sec.

The equation for $\Delta g_i$ as stated above may be formulated for each of the measurement points represented in the diagram in FIG. 6, yielding a non-linear equation system. The synthetic data that was used to generate the measurement curve shown are: m=100,000 t, v=10 m/s, z=70 m, k=6 m and x=18 m. The zero point of the horizontal x-axis was placed in the curve maximum, which corresponds to the point in time at which the radial distance between ship and sensor becomes minimal. With regard to parameter k, which represents the spatial distance between the centers of mass relative to the ship's mass and displaced water mass, it may be assumed that k has a value of several meters for container ships.

The variables x, v and z can be solved by stochastic inversion of the equation system presented. For this, expected intervals are defined that allow a deviation of ±50% from the parameters selected above. Parameter combinations for m, v, x, z and k in the equation stated above are used iteratively. The calculated curves are compared with the synthetic (measured) data in order to determine the parameter combination that best explains the data. In order to obtain usable inversion results, data must be used with different x, y and z positions for at least two sensors.

Use of the determined values for x, v and z simplifies the equation presented ab above. Now if m and k are scanned accurately enough, and the curves calculated on the basis of corresponding parameter combinations are compared with the synthetic (measured), the combination of m and k can be obtained.

The following measures are beneficial for improving the results:

Inclusion of additional data sources (additional sensor units, AIS data, water levels, weather data, GPS data of onboard pilots, cameras, laser-based distance meters, . . . )

Increasing computing power (enables: more precise scanning of the parameter space for m and k, more iterations and consequently greater accuracy in the stochastic inversion method, or also multi-start methods)

Under real-life conditions, it is advisable to ascertain the relationship between m and k while the ship is passing. AI-based methods are particularly helpful for this. When an appropriate function has been found, which describes the relationship between the two variables adequately, variable k may be replaced, so that it can be solved directly after m.

Minimizing the noise in the data may be used to improve the determination of mass.

LIST OF REFERENCE SIGNS

1 Surface of the sea
2 Bottom of navigation channel or seabed
3 Ship
4, 5 Gravitational field strength sensor unit
6 Analytical unit
v Ship's true speed
F Navigation channel
T Depth of water
a Distance between two gravitational field strength sensor units

The invention claimed is:
1. A system for determining a mass of a ship moving in water with at least two gravitational field strength (GFS) sensors, which are installed stationarily relative to the moving ship at a known distance from each other, and an analytical unit that determines the mass of the ship based on gravitational field strength of measurement signals obtained from the at least two GFS sensors.

2. A system according to claim 1, wherein:
the at least two GFS sensors comprise at least one of a gravimeter, an acceleration sensor and at least two synchronized atomic clocks.

3. A system according to claim 2, wherein:
the at least two GFS sensors are each a superconducting gravimeter.

4. The system according to claim 3, wherein:
the measurement signals from the at least two GFS sensors are transmitted to the analytical unit by cable or wireless transmission.

5. The system according to claim 2, wherein:
the measurement signals from the at least two GFS sensors are transmitted to the analytical unit by cable or wireless transmission.

6. A system according to claim 1, wherein:
the measurement signals from the at least two GFS sensors are transmitted to the analytical unit by cable or wireless transmission.

7. The system according to claim 1, wherein:
the at least two GFS sensors are located stationarily in an area of a trajectory of movement of the ship so that the ship passes the at least two GFS sensors.

8. The system according to claim 1, wherein:
the at least two GFS sensors are located in a region of a navigation channel or shipping route.

9. The system according to claim 8, wherein:
the at least two GFS sensors are located on or in a bed of the navigation channel or shipping route so that when a ship passes through the navigation channel between the at least two GFS sensors the ship travels over the GFS sensors, or the at least two GFS sensors are arranged stationarily on a support structure over the navigation channel or shipping route in such manner that the ship passes the at least two GFS sensors when travelling through the navigation channel.

10. The system according to claim 1, wherein:
the analytical unit comprises a computer which determines the mass of the ship based at least on the measurement signals using arithmetic.

11. The system according to claim 10, wherein:
at least the geographical position data of the ship can be calculated using a range identification and tracking system, an automatic identification system or a universal automatic identification system.

12. A use of the system according to claim 1, comprising:
determining a mass distribution within the ship by providing at least two GFS sensors performing time-discrete measurements with a pre-determined scanning rate when a ship passes the at least two GFS sensors; and
the measurement signals are obtained when the time-discrete measurements are taken while the ship passes and are used as the basis for determining the mass distribution of the ship.

13. The use according to claim 12, wherein:
the at least two GFS sensors are located on a ground in a navigational channel or above a passage of the ship at a known distance along the navigation channel or a shipping route and have a spacing distance from each other which is smaller than a ship's length attributable to the ship.

14. The use according to claim 13, wherein:
the scanning rate is at least 1 Hz.

15. The use according to claim 13, wherein:
the measurement signals from the at least two GFS sensors are transmitted to an analytical unit by cable transmission or wireless transmission.

16. The use according to claim 12, wherein:
the scanning rate is at least 1 Hz.

17. A method for determining a mass of a ship moving in water having a local mass influence on the Earth's gravitational field which is measured and used as a basis for determining the mass of the ship so that gravitational field strength under influence of the mass of the ship is measured at each of at least two geographically defined and stationary measurement locations to obtain measurement values of gravitational field strength; and
the mass of the ship is determined based on at least the measurement values.

18. The method according to claim 17, wherein obtaining the measurement values of the Earth's gravitational field is carried out while the ship is moving past the at least two measurement locations.

19. The method according to claim 17, wherein:
a geographical position of the ship is determined relative to stationary measurement locations and is used as a basis for determining the mass of the ship.

20. The method according to claim 17, wherein:
determination of the mass of the ship is based on a gravitational influence $\Delta g_i$ of a local center of mass shift k between a center of mass of the ship and a center of a mass of water displaced by the ship according to a mathematical relationship of:

$$\Delta g_i = \frac{m \cdot G}{x_w^2 + y_{w,i}^2 + z_w^2} - \frac{m \cdot G}{x_w^2 + y_{w,i}^2 + (z_w + k)^2}$$

wherein: g equals gravitational acceleration
m equals ship mass which equals mass of displaced water
G equals gravitation constant
r equals a relationship of spatial distance $$r^2 = x_w^2 + y_w^2 + z_w^2$$

wherein x, y and z represent spatial distances using a Cartesian coordinate system between a sensor and center of mass of the water displaced by the ship; and
k equals distance between the center of mass of the ship and the center of mass of the water displaced by the ship.

* * * * *